May 12, 1942.                P. E. HAWKINSON                 2,282,580
                       METHOD OF RETREADING TIRE CASINGS
                          Filed April 19, 1940          2 Sheets-Sheet 1
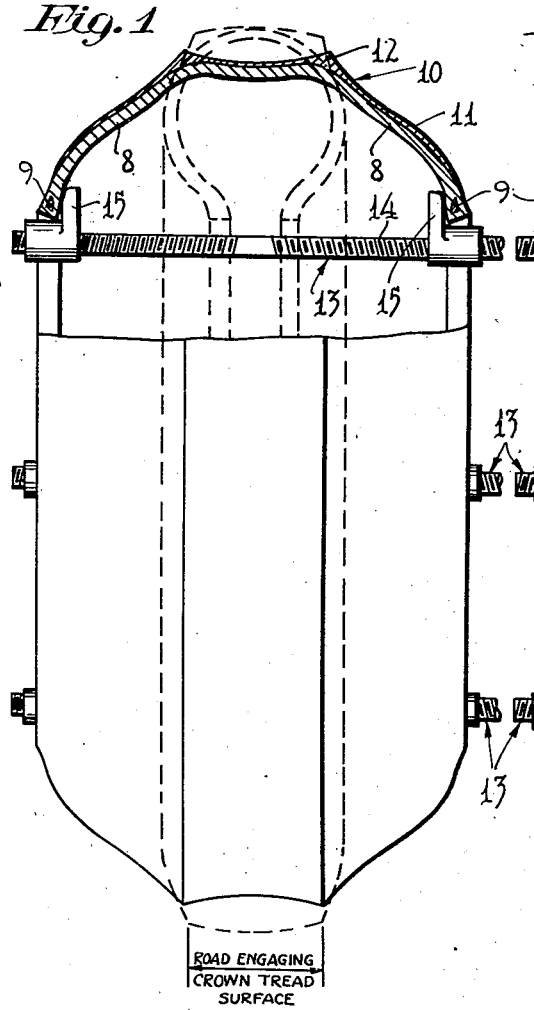
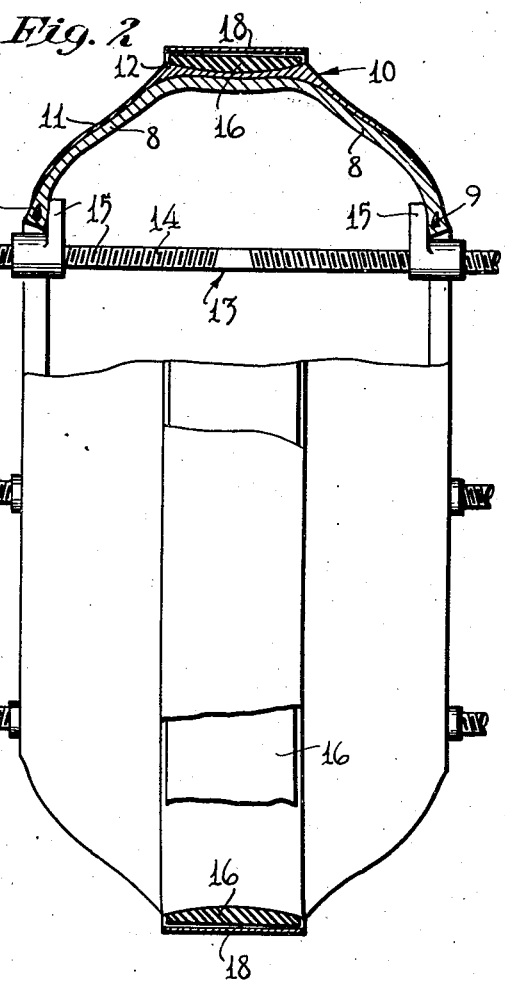
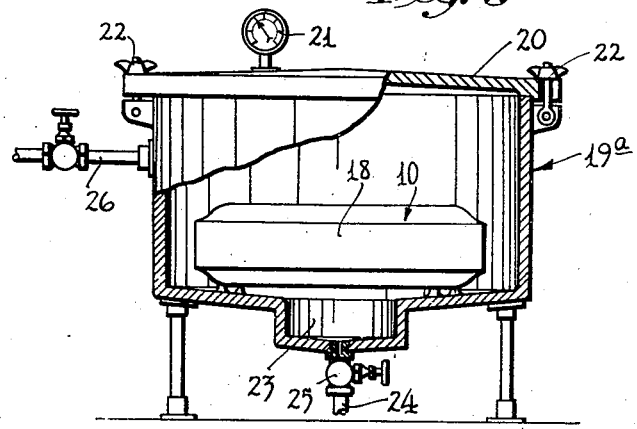
Inventor
Paul E. Hawkinson
By his Attorneys May 12, 1942.   P. E. HAWKINSON   2,282,580
METHOD OF RETREADING TIRE CASINGS
Filed April 19, 1940   2 Sheets-Sheet 2
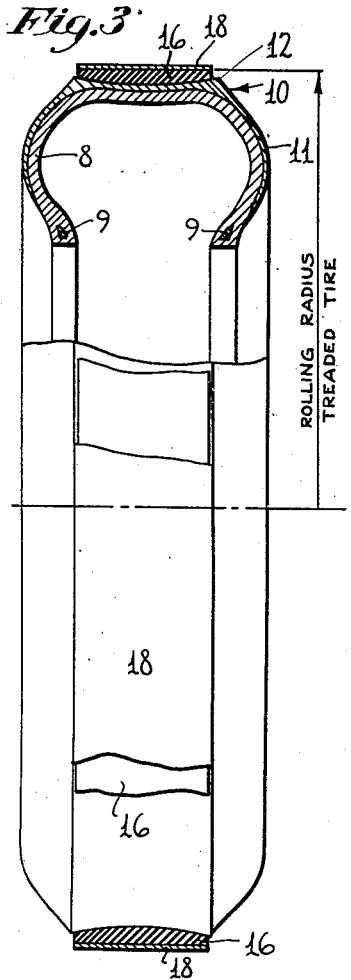
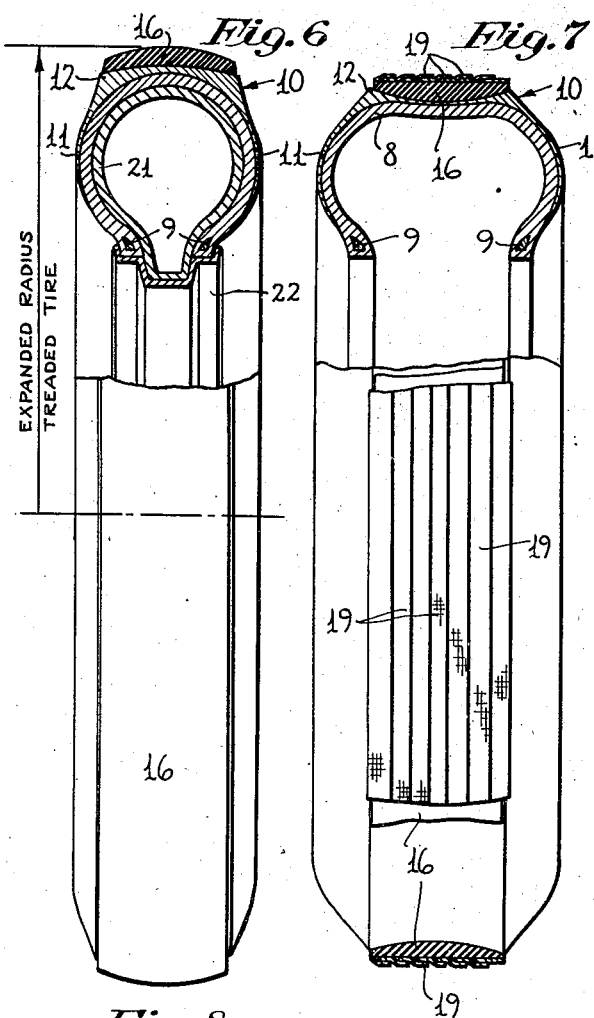
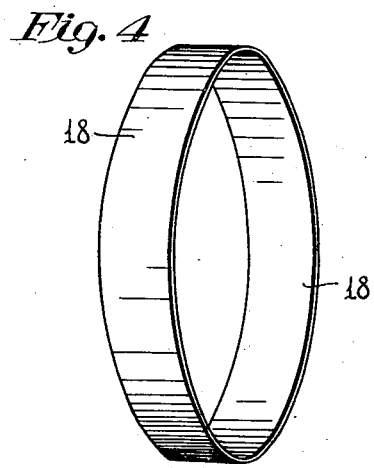
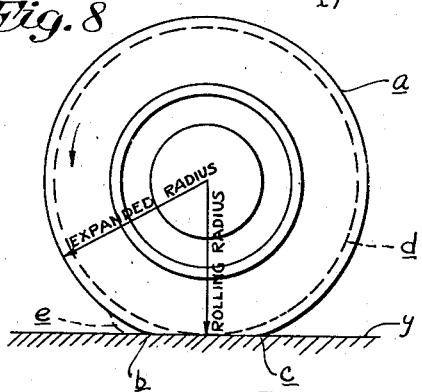
Inventor
Paul E. Hawkinson
By his Attorneys Patented May 12, 1942

2,282,580

UNITED STATES PATENT OFFICE 2,282,580

METHOD OF RETREADING TIRE CASINGS

Paul E. Hawkinson, Minneapolis, Minn., assignor to Paul E. Hawkinson Company, Minneapolis, Minn., a corporation of Minnesota Application April 19, 1940, Serial No. 330,515

5 Claims. (Cl. 18—59)

My present invention relates generally to the art of tire retreading, and more particularly relates to improvements in that class of tire retreading wherein new tread material, usually uncured tread rubber, is cured or vulcanized to the peripheral portion of the tire casing under heat and pressure, without the use of a confining mold, and by subjecting the treaded casing to heated fluid under relatively high pressure.

This general class of retreading without the use of molding equipment has become known as "kettle curing," since such processes usually involve applying an uncured tread material to the tire casing, and then placing the newly treaded casing in a large chamber known as a "kettle," wherein there is maintained live steam under pressure. The heat of the steam serves to bring the newly applied tread material or rubber up to a curing or vulcanizing temperature, while the pressure of the steam exerted directly on the exposed surface areas of the casing and new tread serves to retain the tread in place against flowing action, and to maintain the same under pressure, which is a requirement for satisfactory curing. The main advantage in these hitherto employed systems or methods of retreading by direct subjection of the treaded casing to live steam under pressure is the fact that expensive molding equipment is eliminated.

However, the quality of work previously produced by these so-called "kettle cure" processes has been generally recognized as being inferior to retreading done in conventional molding equipment; the main causes for complaint against kettle cure retreads having been relatively rapid tread wear, as compared to retreads cured in molds, and further, the much greater frequency of separation of the new tread from the tire casing in service of kettle cure retreads as compared to mold cure retreads. The reasons for this more rapid tread wear and more frequent tread separation in connection with kettle cured treads as compared to mold cured treads is no doubt largely due to the fact that the pressure produced by steam on the new tread material is proportional to the temperature of the steam, and since the maximum temperature to which a tire casing can be subjected without serious danger is limited to a point whereat the pressure produced by the steam is relatively very low as compared to pressures employed in mold curing practice, the cured tread is not bonded as tightly to the casing as in mold practice and the tread rubber is cured in a less compacted or more spongy condition than in mold curing practice wherein much higher pressures are employed. In this connection, it may be said that in conventional mold curing practice the new tread is cured usually at a temperature of approximately 275 degrees, and under a pressure of approximately one hundred (100) pounds per square inch upward, whereas at this same temperature a treaded casing cured by steam in a kettle would be subjected to a pressure of only approximately 45 pounds per square inch.

The present invention takes the above noted shortcomings of the so-called kettle cure method of retreading into consideration and provides a new method of kettle curing which very materially improves the results obtained by the finished product by increasing tread wear and greatly decreasing the frequency of tread separation. The improved method and numerous objectives and advantages thereof including the above noted and others will be made apparent from the following specification and claims, together with the appended drawings. In the accompanying drawings, like characters indicate like parts throughout the several views.

Referring to the drawings:

Fig. 1 is a composite view of a conventional tire casing worn down to the point where retreading becomes desirable, and showing the tire in a substantially normal condition by dotted lines and in a laterally spread circumferentially contracted condition by full lines, some parts of the tire being shown in full and some parts being broken away;

Fig. 2 is a view similar to Fig. 1 and illustrates the tire in the same condition of distortion as shown in full lines in Fig. 1, but with a new tread material added to the road engaging crown of the tire and an expansion restraining band applied loosely around the new tread material;

Fig. 3 is a view similar to Fig. 2, but illustrating the treaded tire after the beads have been relieved from lateral spreading action and the new tread material has been expanded into engagement with the confining band;

Fig. 4 is a perspective view of one of the expansion restraining rings;

Fig. 5 is a view partly in side elevation and partly in axial section illustrating the tire as shown in Fig. 3 within a steam kettle as it appears during the curing operation;

Fig. 6 is a view illustrating the treaded tire after it has been cured, removed from the restraining band and expanded to a normal shape;

Fig. 7 is a view corresponding to Fig. 3, but showing the tire restrained against circumferential and radial expansion by a tape wrapping; and Fig. 8 is a diagrammatic view of a conventional pneumatic tire casing in side elevation as it appears under load.

The tire casing shown in the drawings is representative of an average pneumatic tire casing after it has been worn down to the point where it is ready for retreading and in Fig. 1 this casing is illustrated in the normal substantially undistorted condition. This tire casing, as illustrated, comprises a carcass 8 having reinforced rim engaging beads 9; a tread 10 applied over the peripheral crown portion of the carcass, and side wall protecting rubber 11 applied over opposite side walls of the carcass radially inwardly of the heavy tread 10. The carcass 8 is assumed to be of the conventional so-called cord type wherein a plurality of layers of cords of cotton rayon or other suitable substance extends diagonally from bead to bead of the tire and are adhered together but insulated apart by a soft rubber composition, which permits considerable but limited movement of the cords one with respect to the other. By reference particularly to dotted lines Fig. 1 it will be seen that the annular road engaging crown surface of the original tread material 10 is relatively flat in transverse section as compared to the normal substantially circular cross sectional contour of the underlying carcass 8, so that the worn original tread is relatively very thin at its transverse center and has relatively very thick shoulder tread portions radially under the laterally spaced edges 12 of the road engaging crown surface of the original tire material.

The first step in carrying out my improved process consists in preparing the worn casing for reception of a new tread material, and in carrying out the improved method in the preferred manner herein described, this is usually accomplished by buffing the relatively flat worn road engaging tread surface of the original tread material between the edges 12 thereof just sufficiently to true the same up and to clean and roughen the same to provide a good bonding surface. Preferably this buffing operation will be confined to the relatively flat crown surface of the original tread and will not materially reduce the thickness of the worn tread material. To complete the preparation of the casing for reception of the new tread material, the buffed road engaging crown surface of the original tread material is usually given a coat of rubber cement.

The next step in carrying out the method in the preferred manner is to radially contract the road engaging crown portion of the carcass from a substantially normal or expanded radial condition, as shown in dotted lines in Fig. 1, to a very materially contracted condition substantially shown by full lines in Fig. 1 wherein the radius of the road engaging crown surface is illustrated as being somewhat less, at all points about its circumference, than the radial measurement of the casing at its point of engagement with the road under load. This last step is preferably accomplished by radially spreading the beads 9 of the tire, while maintaining the same in substantially parallel relation, from their normal positions as shown by dotted lines in Fig. 1, to the very materially spread condition represented by full lines in Fig. 1. This spreading of the beads is most conveniently accomplished by commercially available power operated spreading devices preferably of the inside arm type, but for the purpose of the present illustration, this spreading of the beads is illustrated as being accomplished by a plurality of hand spreaders 13 applied at circumferentially evenly spaced points about the beads of the tire.

The spreading devices 13 each comprise a handle equipped stem 14 provided with left and right hand screw threads at their opposite end portions, and bead engaging nut acting spreader lugs 15 that are mounted on opposite screw threaded end portions of the stem 14. In spreading the tire, it is highly desirable to space the spreading devices approximately equally and to spread the same equally so that the beads of the tire will be maintained in substantially parallel relation, which will in turn result in even circumferentially and radial contraction of the peripheral or road engaging crown portion of the tire. Of course, the contraction of the peripheral or road engaging crown portion of the tire under lateral spreading action of the beads is the direct result of the diagonal disposition of the cords in the carcass.

The next step in carrying out the method in the preferred manner is the applying to the buffed and cemented road engaging crown surface of the original tread material, intermediate the edges 12 thereof and while the peripheral crown portion of the casing is in a radially and circumferentially contracted condition with its beads spread, an annular band of new tread material 16. The annular band of new tread material 16 will usually be uncured tread stock and this will be rolled or otherwise applied to the cemented and buffed crown of the original tread in a manner to provide a fluid tight bond between the new and old material. This obtaining of a fluid tight bond between the new and old material is particularly important in connection with processes wherein pressure on the new tread rubber is obtained by direct surface contact with the fluid under pressure, since if the fluid under pressure is permitted to work its way between the new and old material, the effect of the pressure in producing a strong bond between the new and old material will be lost.

Whereas I prefer to apply the tread material while the casing is in a laterally spread circumferentially contracted condition as shown by full lines in Fig. 1, and as described above, attention is called to the fact that the process can be carried out by applying the new tread material to the casing while it is in a more or less normal condition as shown, for example, by dotted lines in Fig. 1, and the newly treaded casing thereafter laterally spread and circumferentially contracted to the condition shown in Fig. 2 and by full lines in Fig. 1. This latter procedure, however, makes circumferential contraction of the crown portion of the casing more difficult and has a tendency to weaken the bond between the new and old tread materials; the former of which is still in an uncured state.

The next step in the process consists in applying about the peripheral surface of the newly applied tread material 16, an annular restraining medium which will retain the treaded crown surface in a materially reduced diameter and transversely flattened condition after the beads of the casing have been relieved from spreading action. Such an annular expansion restraining medium may be in the nature of a thin endless sheet metal band such as shown in Figs. 4 and 2, or said restraining medium may be in the nature of a fabric tape wrapping such as shown, for example, in Fig. 7. When the metallic band, indicated by 18 in Figs. 2, 3, and 4, is employed, it will be of just sufficient diameter to slip rather freely over the contracted treaded crown as exemplified in Fig. 2. When the fabric wrapping indicated by 19 in Fig. 7 is employed, this will be spirally wound about the contracted crown rather tightly with its ends suitably retained in place. When the restraining medium, either the band 18 of Figs. 2, 3, and 4, or the wrapping of Fig. 7, is in place, the spreading devices 13 will be removed from the beads so that the casing will exert its full expansive energy against the restraining medium, at which time the tire will appear as shown in Fig. 3 or 7.

The treaded tire is now ready for curing which may be accomplished by subjecting the treaded casing of Fig. 3 or 7 to heated fluid under pressure. This phase of the process is preferably accomplished by placing the treaded casing and its expansion restraining medium 18 or 19 in a suitable steam kettle such as indicated as an entirety by 19a in Fig. 5. In the present illustration, the steam kettle is shown as being provided with a removable cover 20 carrying a steam pressure gauge 21. The removable cover 20 is shown as being rigidly secured in place by wing nut equipped bolts 22. The bottom of the kettle is shown as being provided with a condensation sump 23 from which leads a drain pipe 24 that is normally closed by a valve 25. Steam under pressure is admitted to the interior chamber of the kettle 19 by a steam inlet pipe 26. After the treaded tire with its applied expansion restraining medium is placed in the kettle and the cover closed and sealed, steam under pressure is admitted through the valve equipped pipe 26 from a suitable boiler not shown, and steam under a pressure of thirty-five to forty-five pounds will be built up and maintained during the curing operation. The length of the curing operation will depend on the actual steam pressure and temperature maintained and the thickness of the new tread material 16.

When the curing operation has been completed, the tire will be removed from the kettle and the restraining medium 18 or 19 removed from the treaded and cured tire, this removal of the expansion restraining medium can most readily be accomplished by spreading the beads back to the position shown in Fig. 2 so that the restraining medium is relieved of the natural expanding pressure of the casing. When the expansion restraining medium 18 or 19 is removed, the casing, through its own natural tendency to return to a normal condition such, for example, as illustrated by dotted lines in Fig. 1, will expand circumferentially and contract laterally although this tendency will be retarded and, in fact, be stopped before the casing has fully returned to its normal shape illustrated by dotted lines in Fig. 1, by the contracting pressure exerted by the circumferentially short new tread material 14 which was cured on in a radially and circumferentially short condition which substantially represented the rolling radius of the casing. However, when the tire is equipped with the customary inner tube 21 and wheel rim 22, and inflated as shown in Fig. 6, the tire casing will be returned to a normal expanded condition and the newly applied tread material 16 will be maintained in a stretched condition from which it will tend to contract back to the circumferentially short condition in which it was cured.

In retreading tires, it is usually desirable to decrease to some extent the radius of the cross sectional arc of the road engaging crown surface of the new tread material as compared to the relatively flat road engaging crown surface of the worn tire before retreading. The desirability, of thus doing arises from the fact that the treads of most tire casings wear off somewhat more at their transverse central portions in service than at the transverse edges of their road engaging crown surface so that it becomes desirable in retreading the tire to restore the road engaging crown surface of the tread to a normal more rounding contour transversely, although the cross sectional contour of the road engaging crown of the finished tread, upon inflation, will still be relatively flat as compared to the substantially circular inflated contour of the carcass. To this end, it will be noted by reference to Figs. 2, 3, and 7 that the new tread material 16 has a transversely convex inner surface, and by reference to said figures, it will be seen that the road engaging crown surface of the original tread material assumes a transversely concave shape when the beads of the tire are spread. In most instances the concavity of the crown surface of the original tread material will substantially match the convexity of the new tread material so that the road engaging crown surface of the new tread material will be cured in a substantially transversely flat condition which is the condition thereof when on the road under load.

In Fig. 8 the inflated casing of Fig. 4 is illustrated as it appears in side elevation when on the road under normal load, a road bed being indicated by $y$. In Fig. 8 those portions of the peripheral road engaging crown surface of the tire which are not in engagement with the road are indicated by the outer arcuate full line $a$ and the expanded radius of the casing is indicated by an arrow marked "Expanded radius"; also that part of the road engaging crown surface of the tire actually in engagement with the road, is shown on the straight line $y$ of the road bed between points $b$ and $c$. The reduced rolling circumference of the tire is shown by dotted circle $d$ in Fig. 8 and the rolling radius is indicated by the arrow marked accordingly. In tires wherein the road engaging treads are cured in an expanded radius condition the forced reduction in radius and circumference thereof between points $b$ and $c$, as a result of tire distortion caused by normal load produces a surplus of tread rubber between points $b$ and $c$ which in turn produces a tread wave just ahead of the road contacted portion of the tread, as a result of the reduction in radius at the ground engaging portion when the tire is distorted at this point by the load. Such a tread wave is indicated in Fig. 8 by dotted line $e$ and results in a continual scuffing of the tread against the road at this point, which produces damaging heat and rapid tread wear. However, in tires cured according to the method above set forth, the new treads are stretched and maintained under tension to contract and, in fact, do contract under engagement with the road sufficiently to eliminate or largely eliminate the tread wave present in conventionally cured tires. In other words, in tires treaded according to the present method, that portion of the tread engaging the ground merely returns by its own elasticity to a substantially neutral condition and shape approximately representing the condition and shape it assumed during the curing operation so that there is no surplus rubber to produce a tread wave such as indicated at $e$ in Fig. 8. Hence due to this fact, the tendency of the treads to wear as a result of scuffing action and the tendency of the treads to pull loose from the original tire material is so greatly relieved that the finished product will give greatly improved service as compared to treads similarly cured without a mold but to a substantially normal radius and cross-sectional contour.

It is usually desired to form a tread pattern in any new tread and since this is not accomplished in the molding process it can be readily accomplished after the tire is cured by cutting in a design with a suitable cutting tool or machine. In practice, this can usually be accomplished best by a so-called "re-grooving machine."

The method disclosed in this application is in the nature of an improvement or modification of the method of retreading tire casings disclosed in my co-pending application entitled "Method of retreading tire casings" executed by me of even date herewith and filed April 19, 1940 under Serial No. 330,514. In this connection, it may be said that, whereas the present method as well as the one disclosed in my said co-pending application, is directed to curing a tread on a tire casing while the casing is in a laterally expanded circumferentially and radially contracted condition without the use of a mold and by direct subjection of the casing to heated fluid under pressure, the present method has the advantage over the method of my said co-pending application of maintaining the wide walls of the casing in more nearly the shape assumed thereby under load during the curing operation than does the method of the said co-pending application. Furthermore, the present method has the advantage over that of my said co-pending application of utilizing the expansive energy of the casing on the new tread to obtain a more positive bonding pressure between the new and old material while the new material is subject to heat during the curing operation.

The word "retreading" is herein used in a broad sense to cover the application of tread material to any previously cured tire casing, and this without regard to whether the purpose of adding the tread material be to replace tread material that has been worn off, or otherwise removed or be simply for the purpose of treading new tire casings.

What I claim is:

1. The method of retreading a tire casing which includes the steps of applying a circular band of new tread material to the peripheral portion of the casing and laterally spreading the beads of the casing at circumferentially spaced points to materially reduce the diameter of the road engaging crown portion of the casing at all points about its circumference, in applying over the newly treaded road engaging crown portion of the laterally spread and circumferentially and radially contracted casing an annular expansion restraining band the diameter and circumference of which is materially less than the normal circumference and diameter of the treaded casing, in relieving the beads of the tire from lateral spreading action so as to permit the casing to exert its own expansive energy against the annular restraining band, and in curing the new tread material to the crown portion of the casing by subjecting the entire exposed interior and exterior surface areas of the treaded casing and restraining band to heated fluid under pressure.

2. The method of retreading tire casings which includes applying an annular band of new tread material to the crown portion of the casing, laterally spreading the beads of the casing while maintaining the same in parallel relation and to an extent necessary to materially reduce the diameter of the crown portion of the casing at all points about its circumference, in applying over the newly treaded crown portion of the casing a flexible but endless expansion restraining band having a diameter materially less than the normal diameter of the road engaging crown of the newly treaded casing, in relieving the beads of the casing from lateral spreading action so as to permit the casing to exert its expansive energy against the flexible endless restraining band, and in finally curing the casing while leaving the beads free and while the crown portion of the casing is maintained in a circumferentially contracted condition by said restraining band.

3. The method defined in claim 2 in which the curing of the new tread material of the circumferentially contracted crown of the tire casing is accomplished by subjecting the entire exposed interior and exterior surfaces of the casing and the exposed exterior of the restraining band to heated fluid under pressure.

4. The method of retreading a tire casing having a carcass and an original tread material with a transversely relatively flat road engaging crown surface and thick shoulder tread adjacent the laterally spaced edges of the relatively flat crown surface, which consists in preparing the relatively flat road engaging crown surface of the original tread material for reception of a new tread without materially reducing the thickness thereof, in applying over the present relatively flat road engaging crown surface of the original tread material, with its edges laterally inwardly spaced from the edges of said relatively flat crown surface, an annular band of new tread material, in laterally spreading the beads of the casing while maintaining the same in parallel relation, and to an extent necessary to reduce the radius of the road engaging crown surface of the casing at all points about its circumference to less than the rolling radius of the casing, in applying over the newly treaded radially and circumferentially contracted road engaging crown tread surface of the casing a transversely flat annular expansion restraining band having an internal radius approximating the expected rolling radius of the finished casing, and relieving the beads of the casing from lateral spreading pressure to permit the casing to exert its full expansive energy against said restraining band, and in curing the newly applied tread to the casing while the beads are free and while the road engaging crown surface of the newly applied tread material is in surface contact with the interior of the transversely flat restraining band and the laterally spaced sides of the newly applied tread material radially outwardly of the flat crown surface of the original tread material are exposed.

5. The method of retreading a tire casing which includes applying an annular band of new tread material to the road engaging crown portion of the casing, laterally spreading the beads of the casing while maintaining the same in parallel relation and to an extent necessary to materially reduce the radius of the crown portion of the casing at all points about its circumference, in circumferentially wrapping the road engaging crown portion of the newly applied tread material with a fabric tape while the newly treaded crown portion of the casing is in said circumferentially and radially contracted condition, in relieving the beads of the casing from lateral spreading action so as to permit the casing to exert its own expansive energy against the tape wrapping, and in finally subjecting the entire exposed interior and exterior surfaces of the casing and the exterior surface of the wrapping to heated fluid under pressure, whereby to cure the new tread to the casing in a circumferentially and radially contracted condition.

PAUL E. HAWKINSON.